Jan. 29, 1924. 1,481,887
R. O. BERG ET AL
METHOD OF WELDING TUBES
Filed Sept. 13, 1922 5 Sheets-Sheet 3

Inventors,
Richard O. Berg
Simon Berg
By Stuart C. Barnes
Attorney

Jan. 29, 1924.
R. O. BERG ET AL
1,481,887
METHOD OF WELDING TUBES
Filed Sept. 13, 1922
5 Sheets-Sheet 4
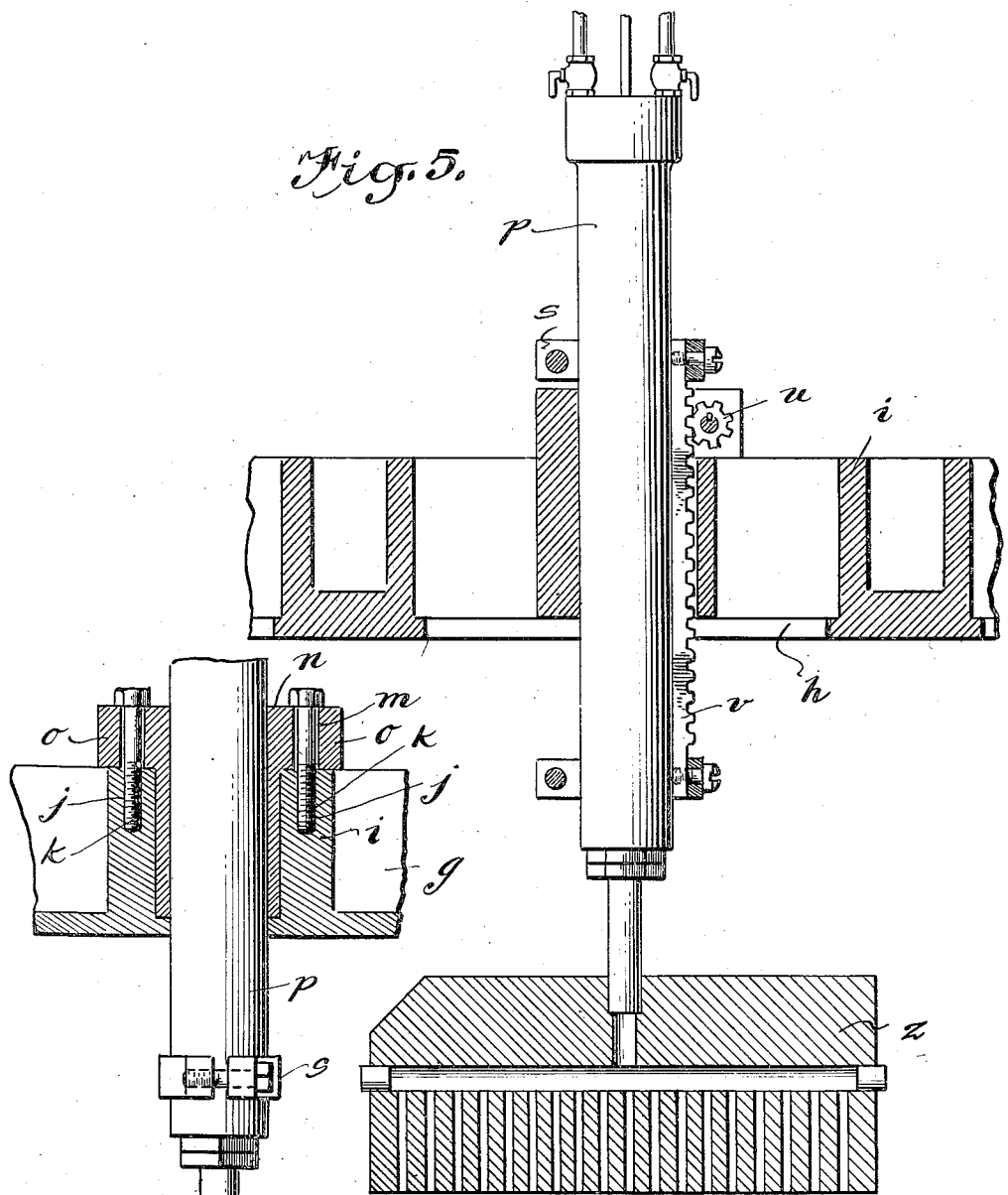
Fig. 5.
Fig. 6.
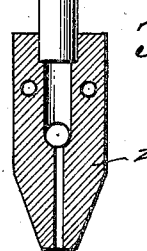
Inventors
Richard O. Berg
Simon Berg
By Stuart C. Barnes
Attorney

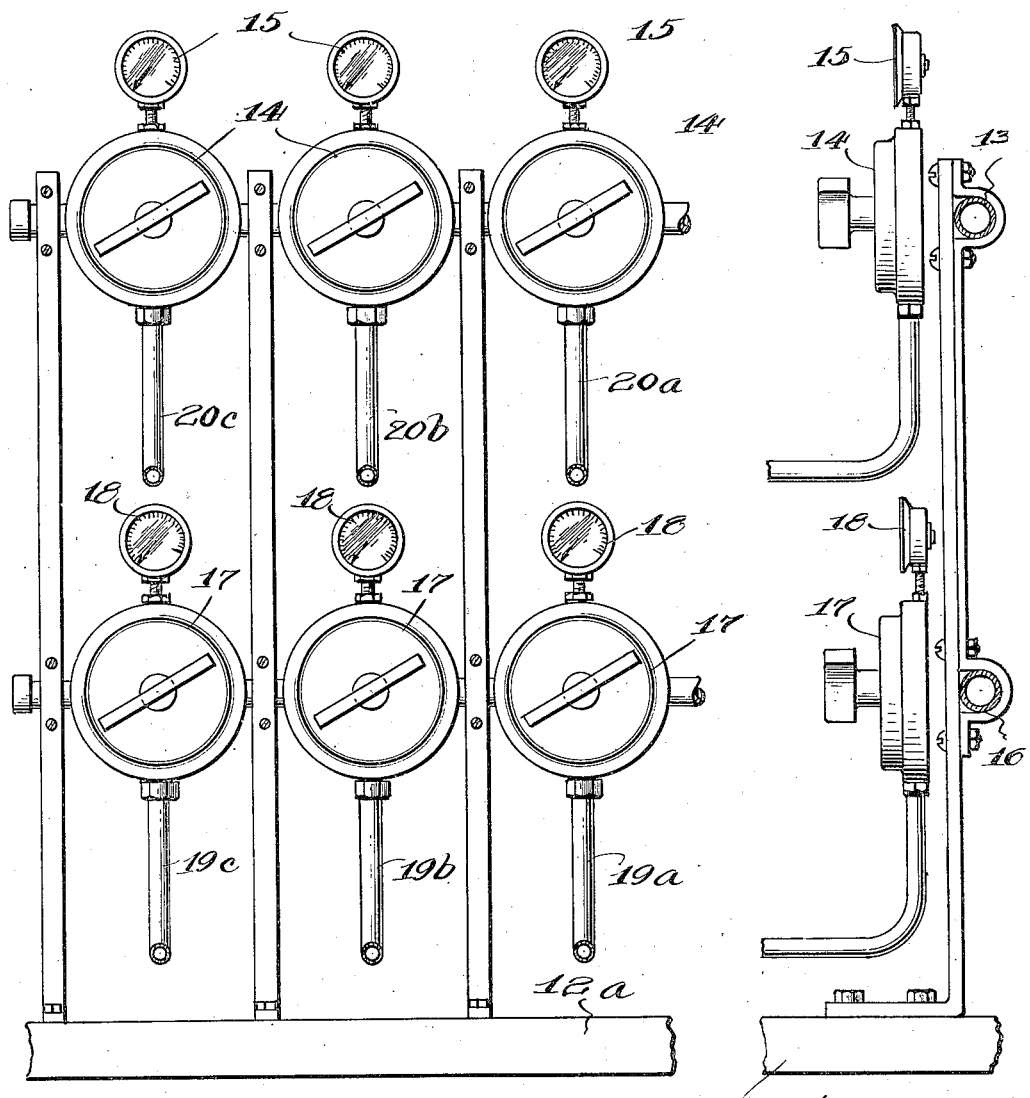

Patented Jan. 29, 1924.

1,481,887

UNITED STATES PATENT OFFICE.

RICHARD O. BERG AND SIMON BERG, OF DETROIT, MICHIGAN, ASSIGNORS TO MICHIGAN STEEL TUBE PRODUCTS COMPANY, OF DETROIT, MICHIGAN, A CORPORATION OF MICHIGAN.

METHOD OF WELDING TUBES.

Application filed September 13, 1922. Serial No. 587,863.

*To all whom it may concern:*

Be it known that RICHARD O. BERG and SIMON BERG, both citizens of the United States, residing at Detroit, in the county of Wayne and State of Michigan, have invented certain new and useful Improvements in Methods of Welding Tubes, of which the following is a specification.

This invention relates to a method of welding tube and especially tube of relatively large cross section and heavy gauge such for instance as 2-3/16" by 10 gauge used for automobile propeller shaft housings and rear axle housings. Heretofore it has been impossible to weld tube as large as this at a satisfactory continuous speed by the oxy-acetylene process. It is the object of the present method to afford ways by which satisfactory welding at relatively high continuous speed may be attained. The essence of the discovery lies in using relatively a large number of flame jets and dividing these into separately adjustable and separately controllable flame jet groups.

The preliminary heating jets are provided with oxygen gas maintained at about 9 lbs. pressure and acetylene gas at about 5 lbs. pressure. It is not so essential that accurate regulation be had with preliminary heating jets although the character of the tube may vary. However, with the welding jets it is of the utmost importance that the pressures of the oxygen and acetylene gases be exactly controlled and that the position of the flames be absolutely correct in order to get the proper penetration of the heat without causing an unusual burr or blow holes in the tube. It will be found in actual practice that the oxygen pressure will vary between 9 and 15 lbs. and the acetylene pressure between 5 and 9 lbs. depending upon the tube that is being welded.

It will be obvious that the group control of pressures and this group adjustment of flame jets can be carried out by various instrumentalities and could conceivably be performed by hand, although, of course, not practically. The invention is therefore in this sense, a method, and in this application the claims are directed to the method while in the co-pending application 578,065, filed July 28, 1922, a machine for practising the method is described and claimed.

In illustrating and describing my method I find it convenient to employ the same disclosures upon which our apparatus application is founded.

In the drawings:—

Fig. 5 is a fragmentary vertical longitudinal section through the torch support, taken on the line 5—5 of Fig. 2. This figure also shows a longitudinal section of the tip.

Fig. 6 is a fragmentary vertical cross section through a portion of the torch support showing both the torch and tip.

Fig. 7 is a front elevation of the pressure gauges and pressure controls on the top of the feed roll block.

Fig. 8 is a side elevation of the same.

Figure 1:
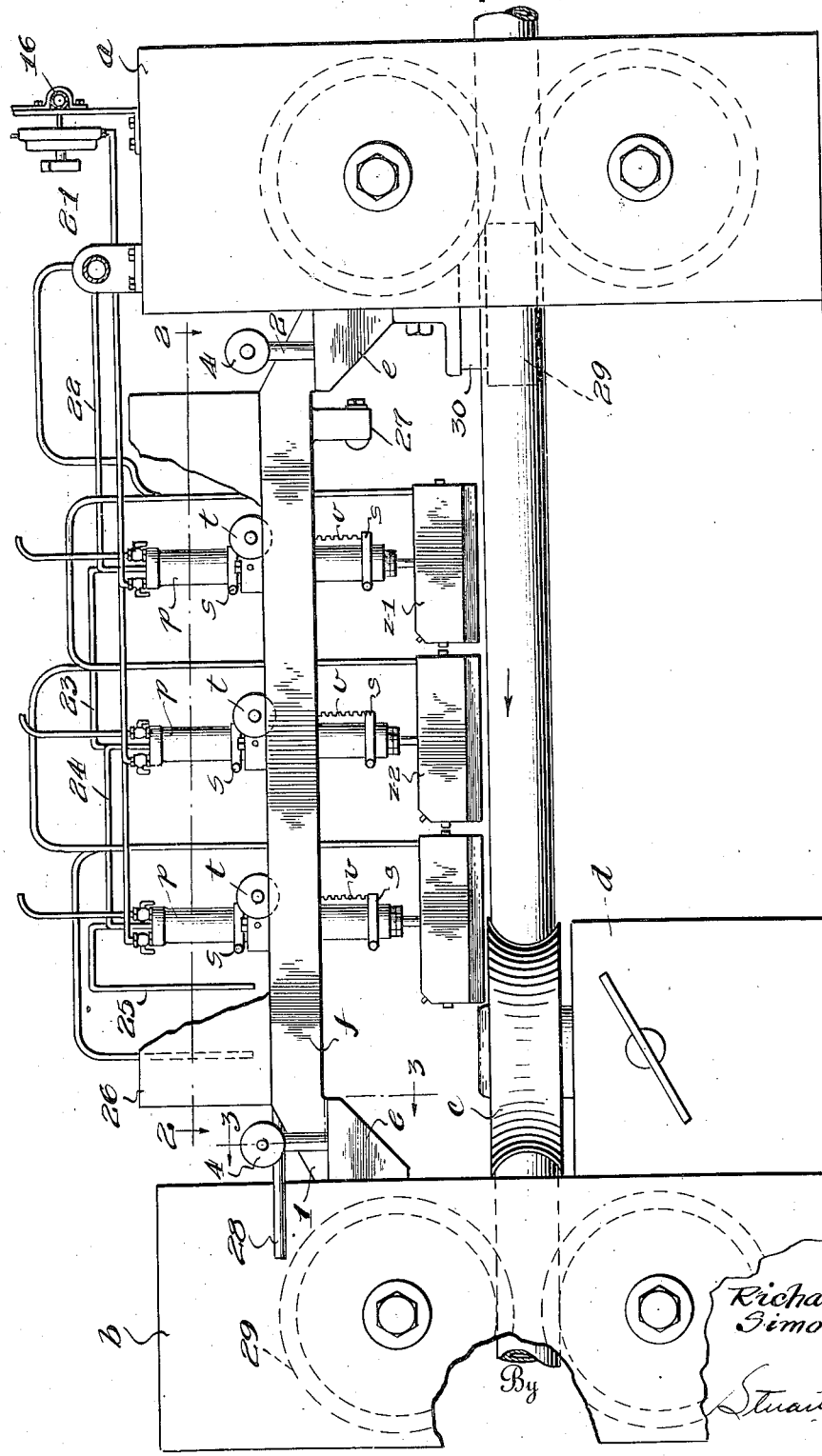
Fig. 1 is a side elevation of the machine.

Referring to Fig. 1, *a* designates a feed roll block in which the feed rolls are supported in any suitable manner. *b* is a second block containing rolls which serve to pull the tube along. *c* represents the sliding or pinch rolls supported in suitable bearings *d*. It has been thought unnecessary to detail the sliding blocks for the feed rolls, the dovetails, etc., to give suitable adjustment and alignment. These features are all well known and in common use in this art.

Figure 2:
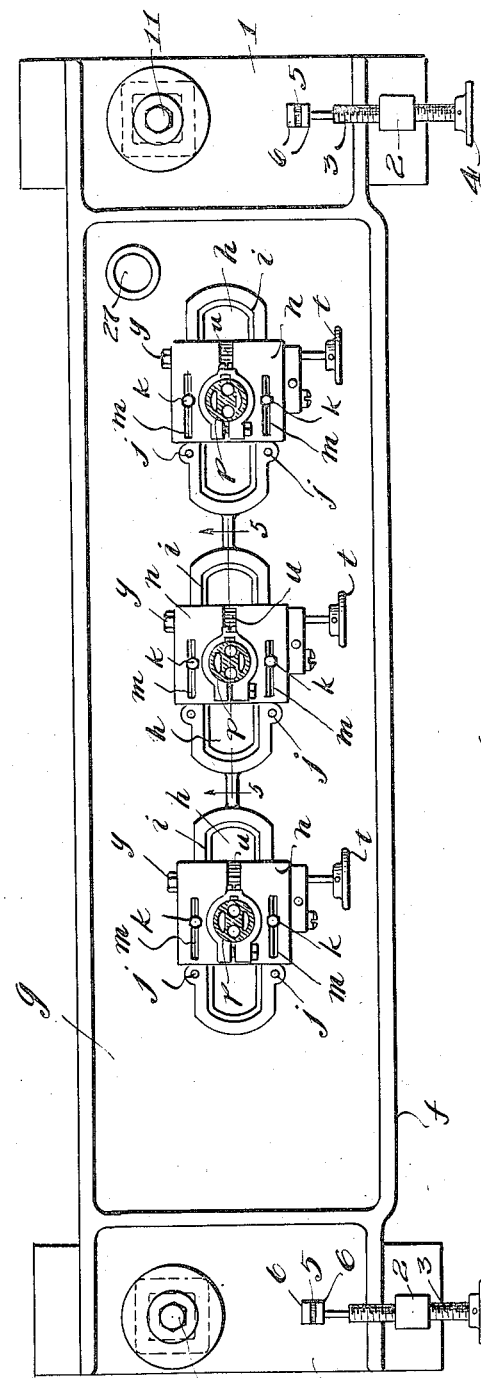
Fig. 2 is a plan view of the torch support, taken on the line 2—2 of Fig. 1.
Figure 3:
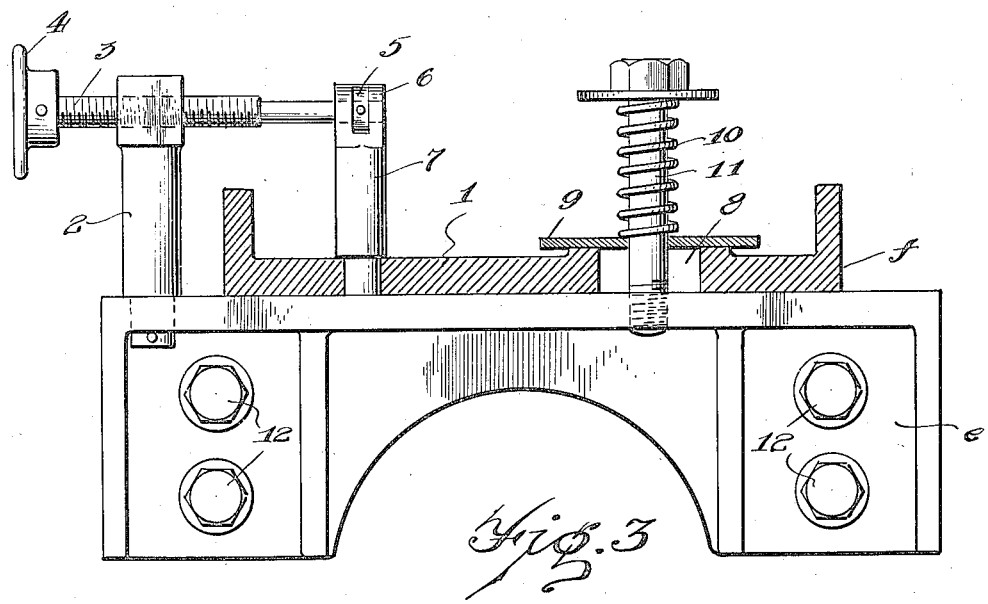
Fig. 3 is a section taken on the line 3—3 of Fig. 1.
Figure 4:
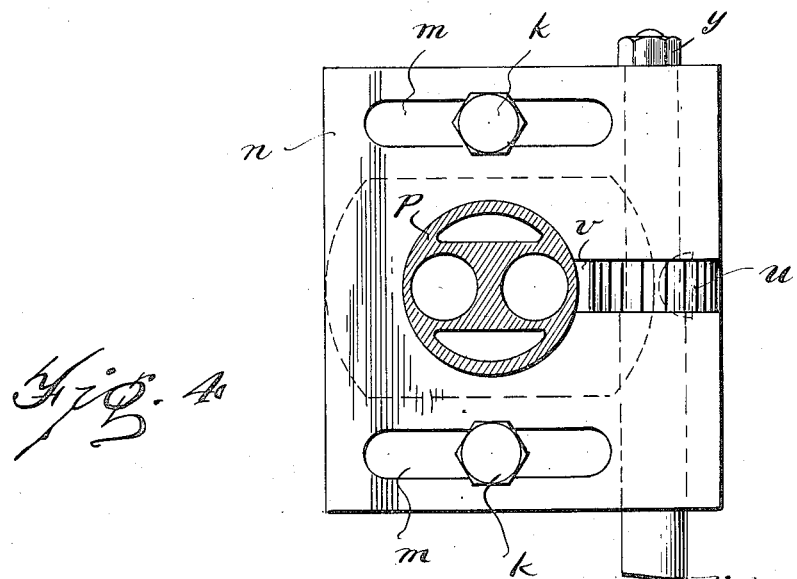
Fig. 4 is an enlarged plan view of one of the torch slides, showing a cross-section of the torch.

Supported on the roll blocks or bearings *a* and *b* are the brackets *e*. These brackets form the rests on which the opposite ends of the torch support and pan *f* are supported. A plan view of this supporting pan is shown in Fig. 2. This is a casting forming a shallow water chamber or tray *g*. This tray is provided with elongated slots *h* which are protected by high walls *i* so that the water cannot escape through runs out as an overflow at the other end through the pipe 28 which discharges over the draft rolls 29 to keep them cool. The torch tips are also preferably, water-cooled and drain into the water tray.

The tube seam is guided to the jets by a mandril 29 and a fin 30. The method is practised by affording separate group control of acetylene and oxygen gases. The jet openings of each tip are considered a collective group; there are three tips shown, each with nineteen holes; however, the method could be practised by using other means than tips, such for instance, as a separate tip for each hole. At the same time the same group of 19 welding flames is adjustable along the line of weld and also toward and from the tube separately. On the other hand, all the groups are adjustable as a unit laterally of the seam, either parallel therewith or angularly therewith at either end.

What we claim is:

1. A method for welding tube comprising the moving of the tube longitudinally and directing against the seam of the tube a relatively large number of oxy-acetylene flame jets divided into groups each with a plurality of flame jets, and separately controlling each group.

2. A method for welding tube, comprising the moving of the tube longitudinally and preliminarily heating and fusing the metal of the seam by simultaneously playing a plurality of preliminary heating and welding jets on one tube adjacent to the seam and separately controlling the pressures of the groups of the flames as units.

3. A method of welding tube, comprising the moving of tube longitudinally, and preliminarily heating and fusing the metal of the tube at the seam by simultaneously playing on a single tube a group of collective welding flames and a group of collective preliminary heating flames and separately controlling each group.

4. A method of welding tube comprising the moving of the tube longitudinally and the preliminarily heating and fusing of the metal at the seam of the tube by simultaneously playing a plurality of oxyacetylene flames on a single tube divided into a preliminary heating group and a welding group and separately controlling the oxygen and acetylene pressures of the groups of flames.

5. The method of welding tube which comprises the moving of the tube longitudinally and preliminarily heating and fusing the metal of the seam of said tube while moving, the simultaneously playing of a plurality of flame jets upon a single tube, said flame jets being divided into groups each with a plurality of jets and positioning each as a unit with respect to the tube seam.

6. A method of welding tube, which consists of moving a tube longitudinally and preliminarily heating and fusing the metal of the tube by a relatively large number of flame jets simultaneously playing upon a single tube and arranged in separate groups each of a plurality of flame jets, and positioning each group with respect to the tube seam.

7. A method of welding tube, which comprises the moving of the tube longitudinally and the preliminarily heating and fusing of metal of the seam by simultaneously playing a plurality of flame jets upon the tube, said flame jets being divided in groups each having a plurality of flame jets and positioning each group longitudinally of the seam.

8. A method of welding tube, which comprises the moving of the tube longitudinally and the preliminarily heating and fusing of the tube edges by simultaneously playing a plurality of flame jets upon a single tube, the said flame jets being arranged in groups, controlling the pressures of the flame jets in one group together and separately from the other groups and positioning each flame group being adjustable with respect to the tube.

9. A method of welding tube, comprising the moving of the tube longitudinally and the preliminarily heating and fusing of the edges of the tube by simultaneously playing numerous flame jets upon a single tube, said flame jets being arranged in groups and longitudinally adjusting each group with respect to the seam and also toward and away from the seam, each group as a unit.

10. A method of welding tube, which comprises the moving of tube longitudinally, the preliminarily heating and fusing of the tube edges by simultaneously playing a multiplicity of flame jets upon a single tube, the said flame jets being divided into groups, positioning each group as a unit with respect to the tube seam and all the groups adjustable as a unit laterally with respect to the seam.

11. A method of welding tube, which comprises the moving of the tube longitudinally and simultaneously preliminarily heating and fusing the edges of a single tube by groups of preliminary heating flame jets and welding jets and positioning the said welding jets and preliminary heating jets in groups toward and away from the seam and longitudinally of the seam and positioning all of the jets in one comprehensive group laterally of the seam.

12. A method for welding tube, comprising the moving of the tube longitudinally and the welding of the same by applying simultaneously to the seam a relatively long line of oxy-acetylene flame jets, arranged in groups each group comprising a plurality of flame jets and the controlling such groups separately.

13. A method for welding tube, comprising the moving of the tube longitudinally, and the preliminary heating and sealing of the tube while so moving by applying simultaneously a long line of numerous flame jets divided into separate groups for both pressure control and position adjustment, each group provided with a plurality of flame jets and so controlling the pressures and adjusting positions for separate groups.

In testimony whereof we affix our signatures.

SIMON BERG.